US011604686B2

(12) United States Patent
Singh et al.

(10) Patent No.: US 11,604,686 B2
(45) Date of Patent: Mar. 14, 2023

(54) SYSTEM AND METHOD FOR SYSTEM FOR ACQUIRING DATA

(71) Applicant: NXP USA, Inc., Austin, TX (US)

(72) Inventors: Shreya Singh, Ranchi (IN); Maik Brett, Taufkirchen (DE); Arpita Agarwal, Delhi (IN); Shivali Jain, Narwana (IN); Anshul Goel, Indirapuram (IN); Naveen Kumar Jain, Panipat (IN)

(73) Assignee: NXP USA, Inc., Austin, TX (US)

( * ) Notice: Subject to any disclaimer, the term of this patent is extended or adjusted under 35 U.S.C. 154(b) by 311 days.

(21) Appl. No.: 16/883,240

(22) Filed: May 26, 2020

(65) Prior Publication Data
US 2020/0379827 A1 Dec. 3, 2020

(30) Foreign Application Priority Data

Jun. 3, 2019 (IN) .............................. 201911021925

(51) Int. Cl.
*G06F 9/54* (2006.01)
*B60R 11/04* (2006.01)
*B60W 50/04* (2006.01)
*G06F 9/38* (2018.01)
*G06F 9/50* (2006.01)
*G06V 10/00* (2022.01)

(52) U.S. Cl.
CPC .............. *G06F 9/544* (2013.01); *B60R 11/04* (2013.01); *B60W 50/04* (2013.01); *G06F 9/3897* (2013.01); *G06F 9/5016* (2013.01); *G06V 10/00* (2022.01); *B60W 2050/041* (2013.01)

(58) Field of Classification Search
CPC ...... G06F 9/5016; G06F 9/544; G06F 9/3897; B60R 11/04; B60W 50/04
See application file for complete search history.

(56) References Cited

U.S. PATENT DOCUMENTS

| 6,624,767 B1 | 9/2003 | Shiu et al. |
| 7,359,325 B1 * | 4/2008 | Lewis ................ H04L 41/0896 370/230.1 |
| 7,562,168 B1 | 7/2009 | Yifrach et al. |
| 8,929,297 B2 * | 1/2015 | Raveendran ............ H04L 47/20 370/328 |
| 10,891,245 B2 * | 1/2021 | Herrmann ........... G06F 13/1673 |
| 2012/0127088 A1 * | 5/2012 | Pance ................. G06F 3/04812 345/173 |

(Continued)

*Primary Examiner* — Henry Tsai
*Assistant Examiner* — Christopher A Daley

(57) ABSTRACT

A method of acquiring data, a computer program product for implementing the method, a system for acquiring data, and a vehicle including the system. The method includes determining one or more data types and virtual channels required for one or more applications. The method also includes allocating a plurality of circular buffers in memory according to the determined data type(s) and virtual channel(s). One or more of the circular buffers are allocated to safety data lines. The remaining circular buffers are allocated to functional data lines. The method further includes storing at least one functional data line in a circular buffer allocated to functional data lines according to a data type and virtual channel of the functional data line. The method also includes storing at least one safety data line in a circular buffer allocated to safety data lines.

20 Claims, 6 Drawing Sheets

(56) References Cited

U.S. PATENT DOCUMENTS

| | | |
|---|---|---|
| 2016/0212456 A1 | 7/2016 | Bohm et al. |
| 2017/0332104 A1 | 11/2017 | Wendel et al. |
| 2019/0057051 A1* | 2/2019 | Herrmann ........... G06F 13/4282 |
| 2020/0326759 A1* | 10/2020 | Sanders ................ G06F 3/0346 |

* cited by examiner

SYSTEM AND METHOD FOR SYSTEM FOR ACQUIRING DATA

BACKGROUND

The present specification relates to a method of acquiring data, a computer program product for implementing the method, a system for acquiring data, and a vehicle including the system.

External camera or radar transmitters use MIPI CSI-2 (Mobile Industry Processor Interface Camera Serial Interface 2) virtual channel and data interleaving to send different video/radar data streams and types of data (ADC data, embedded data). Microcontroller video/radar receiver acquisition systems are expected to correctly handle the routing of data to different regions of memory even if the processing requirements of different data types and virtual channels differ.

Traditionally, the number of buffers on such systems is generally same as the number of virtual channels multiplied by the number of supported data types. Additionally, safety data insertion via inter frame or intra frame packets/line by the external radar/video is becoming common, to identify faults in the data receiving communication channels, for system reliability over such links.

In other systems, the software itself may insert such safety lines/packets at the earliest point in the receiver acquisition path. Systems which support the insertion of safety lines without a buffer overhead do so by cropping the active data content. Systems which do not crop the active lines for replacing safety lines have a buffer overhead (over and above the actual functional buffers) to handle safety line processing.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a method of acquiring data, the method comprising:

determining one or more data types and virtual channels required for one or more applications;

allocating a plurality of circular buffers in memory according to the determined data type(s) and virtual channel(s), in which one or more of the circular buffers are allocated to safety data lines and in which the remaining circular buffers are allocated to functional data lines;

storing at least one functional data line in a said circular buffer allocated to functional data lines according to a data type and virtual channel of the functional data line; and storing at least one safety data line in a said circular buffer allocated to safety data lines.

According to another aspect of the present disclosure, there is provided a system for acquiring data, the system comprising:

memory; and a processor operable to:

determine one or more data types and virtual channels required for one or more applications;

allocate a plurality of circular buffers in the memory according to the determined data type(s) and virtual channel(s), in which one or more of the circular buffers are allocated to safety data lines and in which the remaining circular buffers are allocated to functional data lines;

store at least one functional data line in a said circular buffer allocated to functional data lines according to a data type and virtual channel of the functional data line; and store at least one safety data line in a said circular buffer allocated to safety data lines.

By determining the one or more data types and virtual channels required for an application, and then allocating the circular buffers based on the determined data type(s) and virtual channel(s), there is no need to provide buffers in memory for all possible applications, data types and virtual channels. This may considerably reduce the memory space required for the provision of the buffers. Moreover, the provision of a dedicated buffer for safety data lines may allow the same functional path to be used to process the functional lines and safety lines, without cropping active lines in the received data.

The allocation of the circular buffers may be performed at system start-up.

The at least one safety data line and the at least one functional data line may be received from an external component. The external component may, for instance be a RADAR system of a vehicle, or an external camera of the vehicle. There may be more than one external component.

The at least one safety data line may be processed using a same functional path as a functional path used for processing the at least one received functional data line.

The at least one safety data line may be generated locally, e.g. by software of the system. In such cases, the at least one safety data line may be received/processed along a different data path to the data path used for processing the at least one received functional data line.

The method may include performing a self test routine (e.g. a Built in Self Test (BIST) routine) in which test data is generated locally (e.g. by software of the system) and received along the aforementioned different data path along which the at least one safety data line is received. Accordingly, embodiments of this disclosure can obviate the overhead associated providing the system with separate BIST logic.

The at least one safety data line may be received or generated while no functional data lines are being received.

The one or more applications may include vehicle RADAR and/or an external camera of a vehicle.

According to a further aspect of the present disclosure, there is provided a computer program product on a carrier medium, comprising program instructions for implementing the method of any of claims 1 to 7.

According to another aspect of the present disclosure, there is provided a vehicle comprising the system of any of claims 9 to 14.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
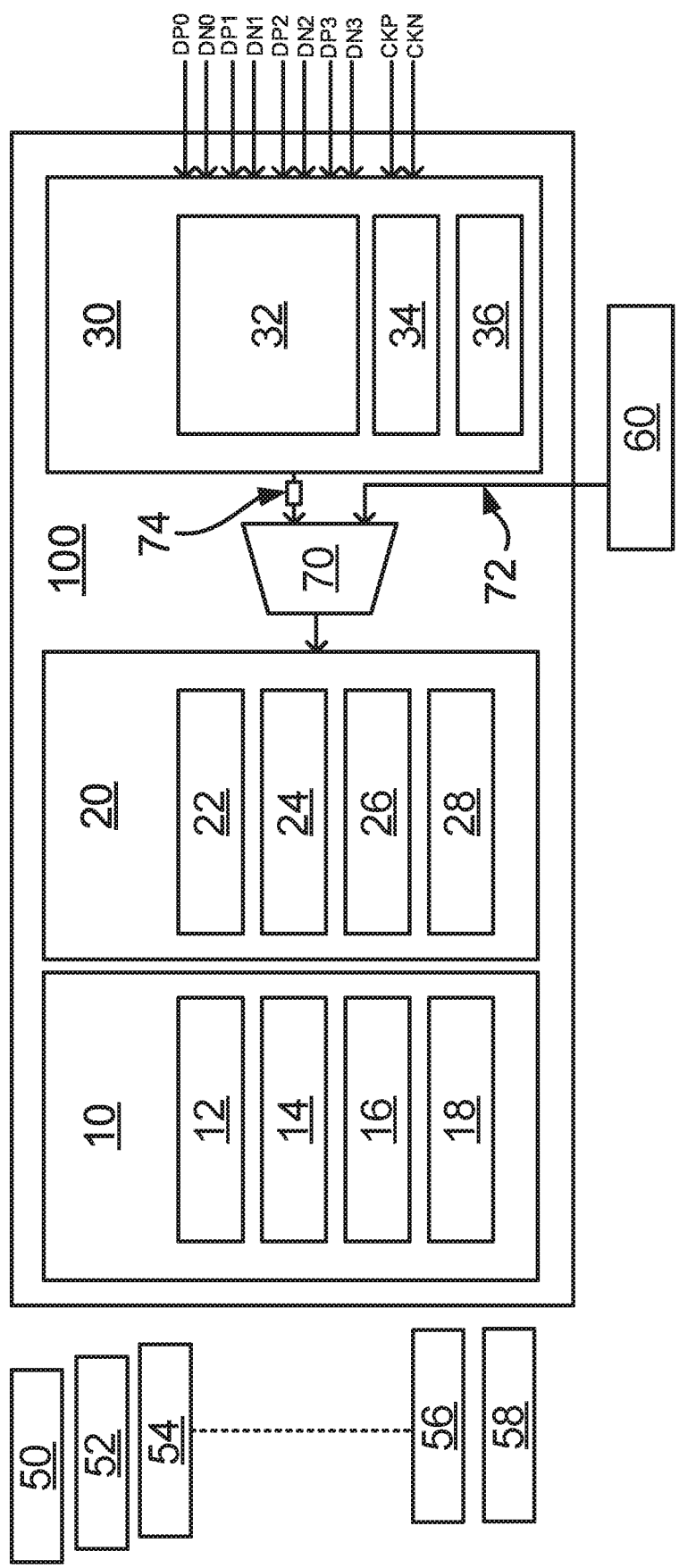
FIG. 1 shows the multiplexing of safety lines and functional lines using a configurable buffer architecture according to an embodiment of this disclosure.

FIG. 1 shows the multiplexing of safety lines and functional lines using a configurable buffer architecture according to an embodiment of this disclosure.

The system 100 in FIG. 1 may include a processor and memory (e.g. Static Random Access Memory (SRAM)). The memory may store software including program instructions executable by the processor for implementing the methods described herein. The system 100 may be included in a vehicle such as a car, van or truck, for processing data relating to various applications. These applications may, for instance, include the processing of vehicle RADAR data and the processing of camera (e.g. an external camera) data such as video data.

The system in FIG. 1 includes a number of functional blocks. These will be described below.

Block 10 is operable to perform pixel processing and buffer management for the data to be processed. In the present embodiment, the pixel processing and buffer management block 10 includes a number of sub-blocks. These sub-blocks include a pixel processing and data type and virtual channel identification sub-block 12, an Advanced eXtensible Interface (AXI) handling sub-block 14, an active chirp/video data buffer management block 16 and an embedded/user defined buffer management sub-block 18.

Block 20 is an RX controller block for handling receipt of data according to one or more data types and virtual channels. For instance, the data types include RADAR data or video data as noted above. In the present embodiment, the RX controller block 20 may be configured to processes the received data according to the Mobile Industry Processor Interface Camera Serial Interface 2 (MIPICSI2) specification.

The RX controller block 20 may include a number of sub-blocks. These sub-blocks may include a lane merging sub-block 22, a pixel formatting sub-block 24, a data cyclic redundancy check (CRC) sub-block 26 and an error correction code header (ECC) sub-block 28.

The system 100 may also include a multiplexer 70. As will be described below, the multiplexer is operable to multiplex safety data lines and functional data lines received from one or more external devices such as a vehicle RADAR system or video camera, before passing them on to the RX controller block 20. The multiplexer 70 may also be operable to receive and multiplex safety lines that are received from software 60 (e.g. Microcontroller software) of the system 100 with the functional data lines received from the external device(s). The multiplexer 70 may also be operable to receive and multiplex both safety lines and functional data lines that are received from software 60, e.g. as part of a Built In Self Test (BIST) procedure.

The system 100 also includes a physical layer 30. The physical layer 30 may be compatible with the Mobile Industry Processor Interface (MIPI) DPHY physical layer standard. The physical layer 30 includes a plurality of lanes for the receipt of data from the external devices noted above. These lanes may include a number of RX data lanes 32. In the present embodiment, there are four such data lanes (for receiving differential data signals DP0, DN0, DP1, DN1, DP2, DN2, DP3, DN3), although in principle any number of data lanes may be provided. The physical layer 30 may also include a clock lane 34 associated with the data lanes 32. The clock lane 34 is operable to review differential clock signal CKP, CKN. The physical layer 30 may also include a calibration block 36 for calibration of the data lanes 32 and clock lane 34. The physical layer 30 is connected to the multiplexer 70, to allow the received data to be passed to the multiplexer 70 for multiplexing and subsequent provision to the RX controller block 20 and the pixel processing and buffer management block 10.

The system 100 is operable to allocate a plurality of circular buffers in memory. These circular buffers are allocated according to a number of determined data type(s) and virtual channel(s). The circular buffers that are required for operation of the system may be determined at system start-up. The determination may be made on knowledge of the applications that will be required to be handled by the system 100. For instance, as noted above, the applications may include vehicle RADAR and an external camera of the vehicle. With knowledge of the applications that will be implemented, including knowledge of the data types and virtual channels that will be needed, the system 100 can accordingly allocate a required number of circular buffers in memory, for buffering the output of the multiplexer 70. The knowledge of the required applications may be stored in the memory of the system for retrieval at system start-up, and/or may be determined by interrogation of the external devices (e.g. vehicle RADAR system, external camera system) at system start-up.

Because the circular buffers are allocated according to knowledge of the required applications at system start-up, only the required number of circular buffers may be allocated, reducing memory size requirements for the system. This may be compared, for instance, with an approach in which enough memory space must be provided in the system for circular buffers according to all possible applications, data types and virtual channels.

In the embodiment shown in FIG. 1, N circular buffers are allocated. These circular buffers may include:
- a first circular buffer 50 in this example is allocated to active data processing in a first virtual channel;
- a second circular buffer 52 in this example is allocated to active data processing in a second virtual channel;
- a third circular buffer 54 in this example is allocated to embedded data processing in the first virtual channel;
- an $n-1^{th}$ circular buffer 56 in this example is allocated to safety line data processing in the first virtual channel; and
- an $N^{th}$ circular buffer 58 in this example is allocated to user defined data processing in a third virtual channel.

It will be appreciated that the buffers allocated in FIG. 1 are just examples, and that any combination of buffers allocated according to data type and virtual channel is envisaged.

In accordance with embodiments of this disclosure, the circular buffers are allocated in memory according to the determined data type(s) and virtual channel(s), e.g. at system start-up. Typically, one or more of the circular buffers is allocated to safety data lines. Although a plurality of circular buffers may in principle be allocated to safety line data, it is envisaged that in practice, for a given combination of data types and virtual channels, a single circular buffer may be allocated to safety line data. This can allow safety line processing for the various applications handled by the system to be accommodated in a manner that minimises memory space requirements for the allocation of the circular buffers. Irrespective of the number of circular buffers that are allocated to safety line data, the remining buffers would typically be allocated to functional data lines.

To process the incoming data, the system 100 may store the data in the circular buffers according to the allocation of each buffer. For instance, this may involve storing functional data lines in a circular buffer allocated to functional data lines for that data type and virtual channel. This may also involve storing safety data lines in a (the) circular buffer allocated to safety data lines. The received data may be put into the circular buffers described herein following some processing, and data type and virtual channel identification. The circular buffers are located in the system memory. Typically, placing the received data in the circular buffers according to data type and virtual channel may be the final step performed by the pixel processing and buffer management block 10.

Figure 2:
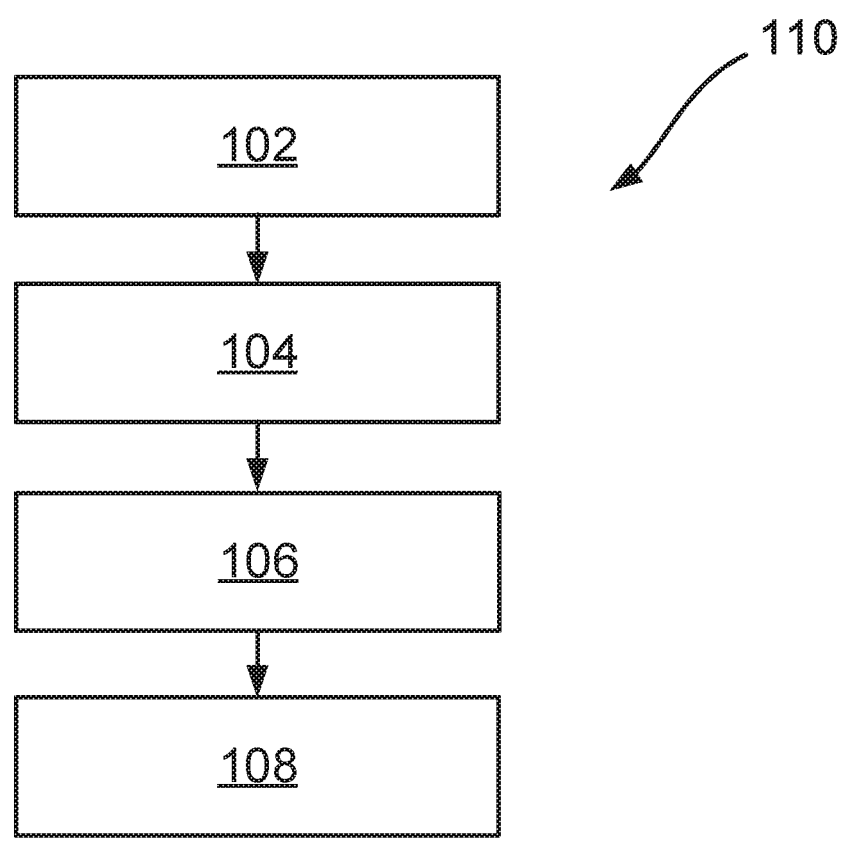
FIG. 2 shows a method of acquiring data according to an embodiment of this disclosure.

To summarize, FIG. 2 shows a method 110 of acquiring data according to an embodiment of this disclosure. In step 102, the system may determining one or more data types and virtual channels required for one or more applications as described above. In step 104, the system 100 may allocate a plurality of circular buffers in memory according to the determined data type(s) and virtual channel(s), in which one or more of the circular buffers are allocated to safety data lines and in which the remaining circular buffers are allocated to functional data lines. In step 106, the system 100 may storing at least one functional data line in a circular buffer allocated to functional data lines according to a data type and virtual channel of the functional data line. In step 108, the system 100 may store at least one safety data line in a circular buffer allocated to safety data lines.

Figure 3:
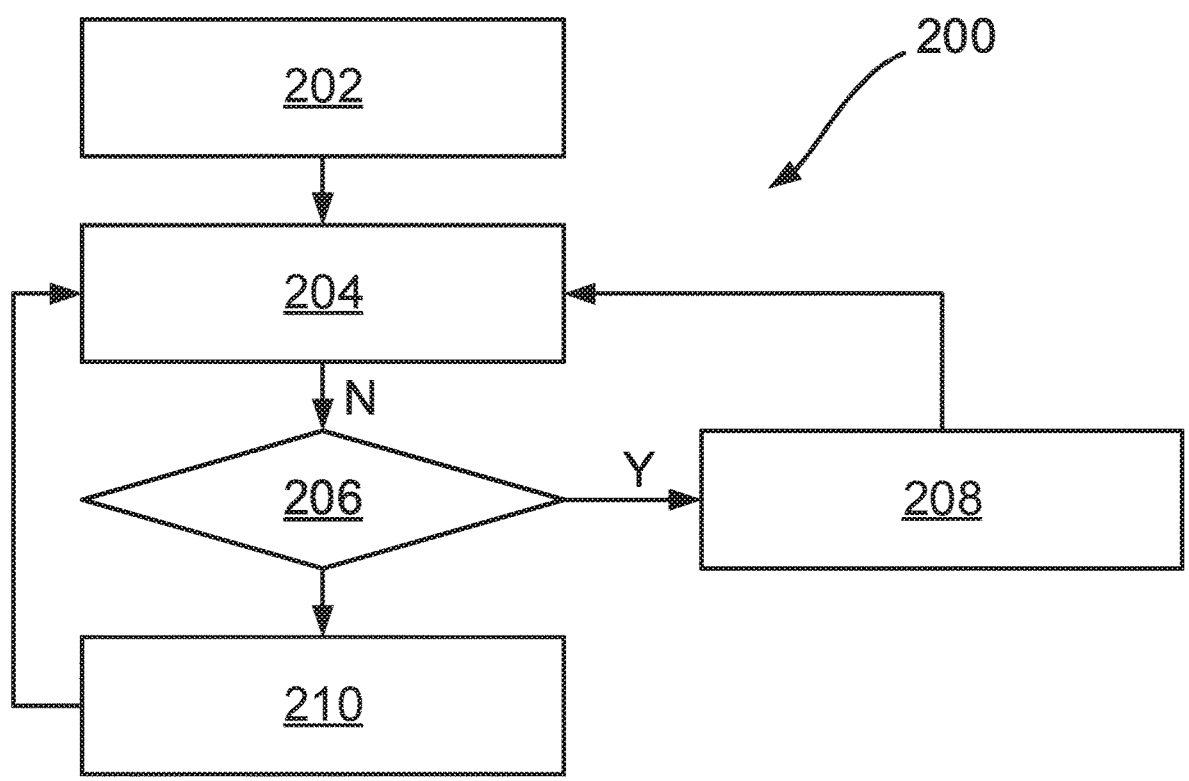
FIG. 3 shows a method of handling safety lines according to an embodiment of this disclosure.

FIG. 3 shows a method 200 of handling safety lines according to an embodiment of this disclosure.

In step 202, the system shown in FIG. 1 begins to receive data. As noted previously, the data may be associated for a range of applications, but for the purposes to this embodiment, it may be assumed that the data comprises data from an external device or devices such as a vehicle RADAR system or (e.g. video) camera system.

In step 204, the received data are written to the appropriate circular buffer in the memory. As part of this, the pixel processing and buffer management block 10 may direct the received data to the relevant buffer based on virtual channel and data type identifiers that may be included in the data, according to the allocation of the circular buffers made at system start up. Any additional functionality (such as calibration data for the RADAR system) can also be accommodated by directing the received data to the appropriate buffer in this way.

In step 206, the system 100 may determine whether safety lines are present in the received data. As part of this determination, the system 100 may also determine the origin of the safety lines. If the safety lines are being inserted by software 60 (e.g. Microcontroller software) of the system 100, then the method may proceed to step 210. On the other hand, if the safety lines are being inserted by an (e.g. Mobile Industry Processor Interface Camera Serial Interface 2 (MI-PICSI2) compliant) external device (such as a vehicle radar system or vehicle camera), the method may proceed to step 208.

In step 208, since it has been determined that the safety lines are being inserted by an external device, then the RX controller block 20 allows the same path (see the PHY-Protocol Interface (PPI) path labelled 74 in FIG. 1) as the path for functional data reception from the physical layer 30 to continue to be exercised for the receipt of the safety lines. Because of the aforementioned allocation of the circular buffers in memory, the insertion of the safety lines may be implemented without requiring any of the active image data or RADAR data to be cropped. In particular, because a separate buffer is allocated to be used for storing safety line data (to the buffer(s) used for functional data lines), cropping of the active image data or RADAR data can be avoided.

In step 210, since it has been determined that the safety lines are being inserted by system software, the RX controller block 20 chooses an alternate PHY-Protocol Interface (PPI) data path 72 shown in FIG. 1, for the receipt of the safety lines from the software 60. Again, because of the aforementioned allocation of the circular buffers in memory, the insertion of the safety lines may be implemented without requiring any of the active image data or RADAR data to be cropped. Again, because a separate buffer is allocated to be used for storing safety line data (to the buffer(s) used for functional data lines), cropping of the active image data or RADAR data can be avoided.

Following step 208 or 210, the method may return to step 204, for the allocation of subsequent functional data to the appropriate circular buffer. Subsequently, the method may proceed once more to step 208 or step 210 if it is determined in again in step 206 that safety lines are present in the received data.

Figure 4:
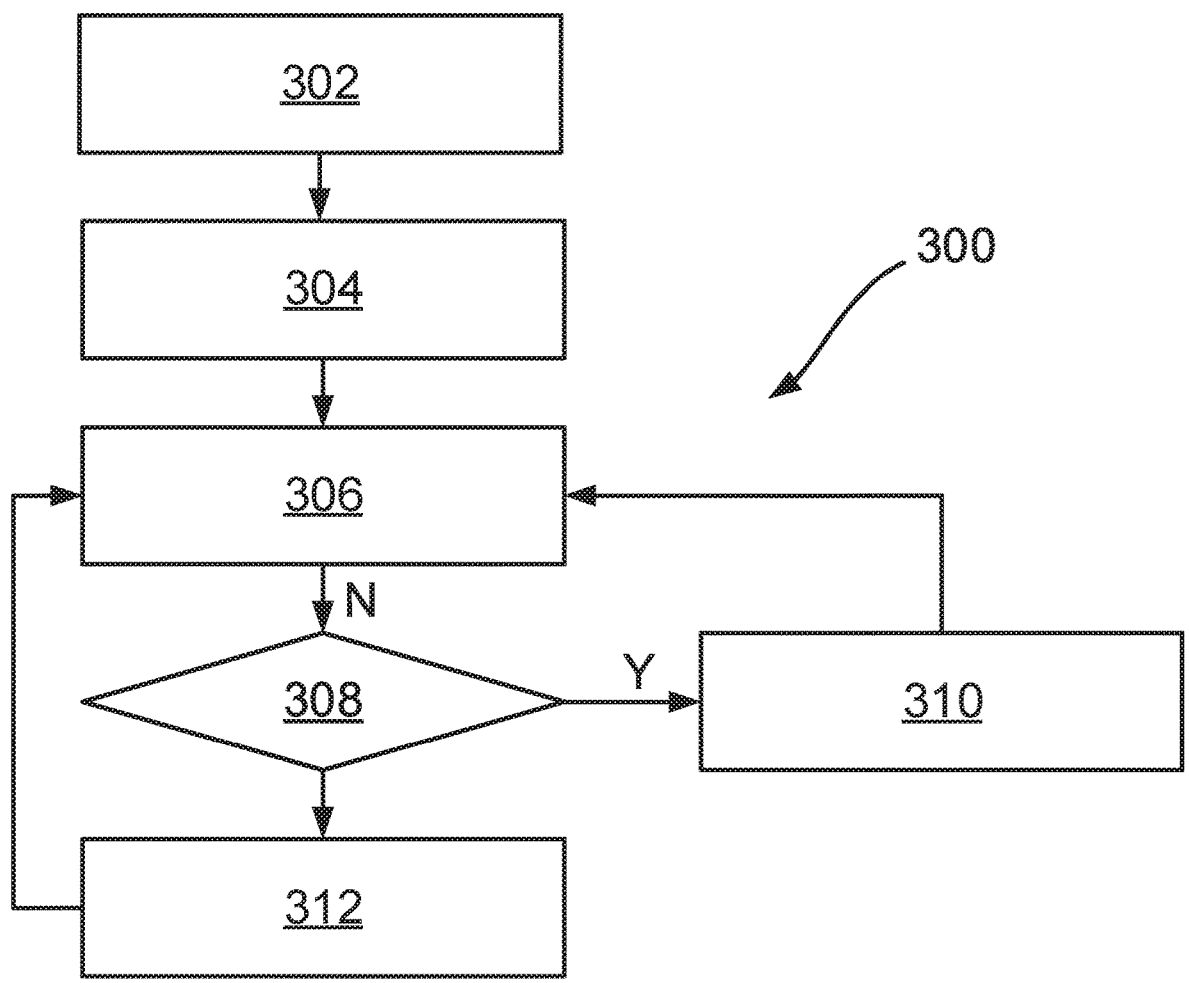
FIG. 4 shows a method of handling safety lines with support for Built In Self Test (BIST) functionality according to another embodiment of this disclosure.

FIG. 4 shows a method 300 of handling safety lines with support for Built In Self Test (BIST) functionality according to another embodiment of this disclosure.

In step 302, the system shown in FIG. 1 begins to receive data. As noted previously, the data may be associated for a range of applications, but for the purposes to this embodiment, it may be assumed that the data comprises data from an external device or devices such as a vehicle RADAR system or (e.g. video) camera system. The received data are written to the appropriate circular buffer in the memory.

In step 304, while the (e.g. MIPI DPHY) physical layer 30 is being initialised, software 60 or a built in Pseudo Random Number Generator (PRNG) can feed BIST data using the data path 72 in FIG. 1 (i.e. the data path that was used for the insertion of software generated safety lines in the method of FIG. 3). This data may be used for the self testing of the digital circuitry of the system 100.

Following the Built In Self Testing procedure in step 304, initialisation of the system 100 including the physical layer 30 may be completed, and the normal operation of the system 100 may begin. Accordingly, the remainder of the method of FIG. 3 may be similar to that described above in relation to FIG. 3.

In step 306, data received from one or more external devices (e.g. a vehicle RADAR system or a vehicle camera) are written to the appropriate circular buffer in the memory. As part of this, the pixel processing and buffer management block 10 may direct the received data to the relevant buffer based on virtual channel and data type identifiers that may be included in the data, according to the allocation of the circular buffers made at system start up. Again, any additional functionality (such as calibration data for the RADAR system) can also be accommodated by directing the received data to the appropriate buffer in this way.

In step 308, the system 100 may determine whether safety lines are present in the received data. As part of this determination, the system 100 may also determine the origin of the safety lines. If the safety lines are being inserted by software 60 (e.g. Microcontroller software) of the system 100, then the method may proceed to step 312. On the other hand, if the safety lines are being inserted by an (e.g. Mobile Industry Processor Interface Camera Serial Interface 2 (MI-PICSI2) compliant) external device (such as a vehicle radar system or vehicle camera), the method may proceed to step 310.

In step 310, since it has been determined that the safety lines are being inserted by an external device, then the RX controller block 20 allows the same path (see the PHY-Protocol Interface (PPI) path labelled 74 in FIG. 1) as the path for functional data reception from the physical layer 30 to continue to be exercised for the receipt of the safety lines. Because of the aforementioned allocation of the circular buffers in memory, the insertion of the safety lines may be implemented without requiring any of the active image data or RADAR data to be cropped.

In step 312, since it has been determined that the safety lines are being inserted by system software, the RX controller block 20 chooses an alternate PHY-Protocol Interface (PPI) data path 72 shown in FIG. 1, for the receipt of the safety lines from the software 60. Note that this is the same path that was used in step 304 for feeding the BIST data to the digital circuitry of the system 100. Again, because of the aforementioned allocation of the circular buffers in memory, the insertion of the safety lines may be implemented without requiring any of the active image data or RADAR data to be cropped.

The method of FIG. 4 can allow the system 100 to implement Built In Self Test (BIST) procedures in a manner that does not expressly require the provision of dedicated BIST logic. This is because the path 72 that is used during normal operation for the insertion of safety lines by the software 60 can be re-used by the system for supplying BIST data from the software 60. This can increase the available chip space in or more integrated circuits of the system 100 and reduce the overall cost of the system 100.

Figure 5:
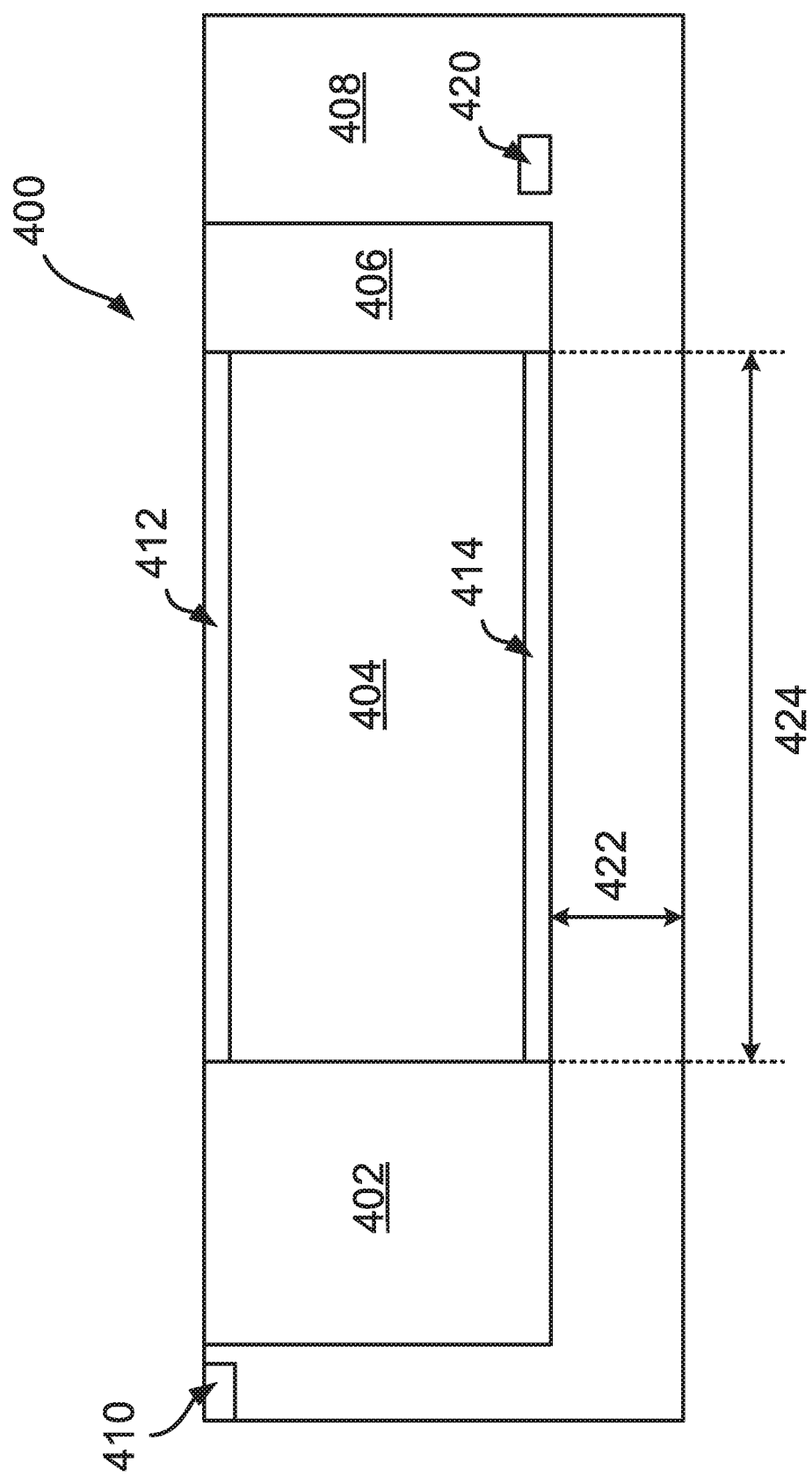
FIG. 5 shows a data packet.

FIG. 5 shows a data packet 400. The packet 400 includes a frame start 410, a frame end 420, a packet header 402, a checksum portion 406 (which may also include a filler if required for the physical layer 30 (e.g. under DPHY)), and a payload. The payload includes a frame 404 of data. The frame 404 may for instance comprise RADAR data or video data received from a vehicle RADAR system or external camera of the vehicle. The frame 404 may also include a number of lines of embedded data 412, 414. In particular, zero or more lines of embedded data 412 may be included at the start of the frame 404 and zero or more lines of embedded data 414 may be included at the end of the frame 404. The embedded data 412, 414 may for instance comprise safety data lines or test data (BIST) lines of the kind described above.

As shown by the arrow labelled 424 in FIG. 5, the payload data in each packet must be a multiple of some predetermined number of bits (e.g. 8 bits) in length. Line blanking of the packet is shown at 408, and frame blanking is shown by the arrow labelled 422.

When a single circular buffer is used per virtual channel, the lines of embedded data 412, 414 must be located at the start of the frame or at the end of the frame as noted above. This is because it is not possible to capture embedded data that is located in between lines of frame data 404. In the data packet 400 of FIG. 5, if embedded data were to be located in between active lines of frame data 404, then the actual RADAR data or video data may be overwritten when using a single buffer per virtual channel.

Figure 6:
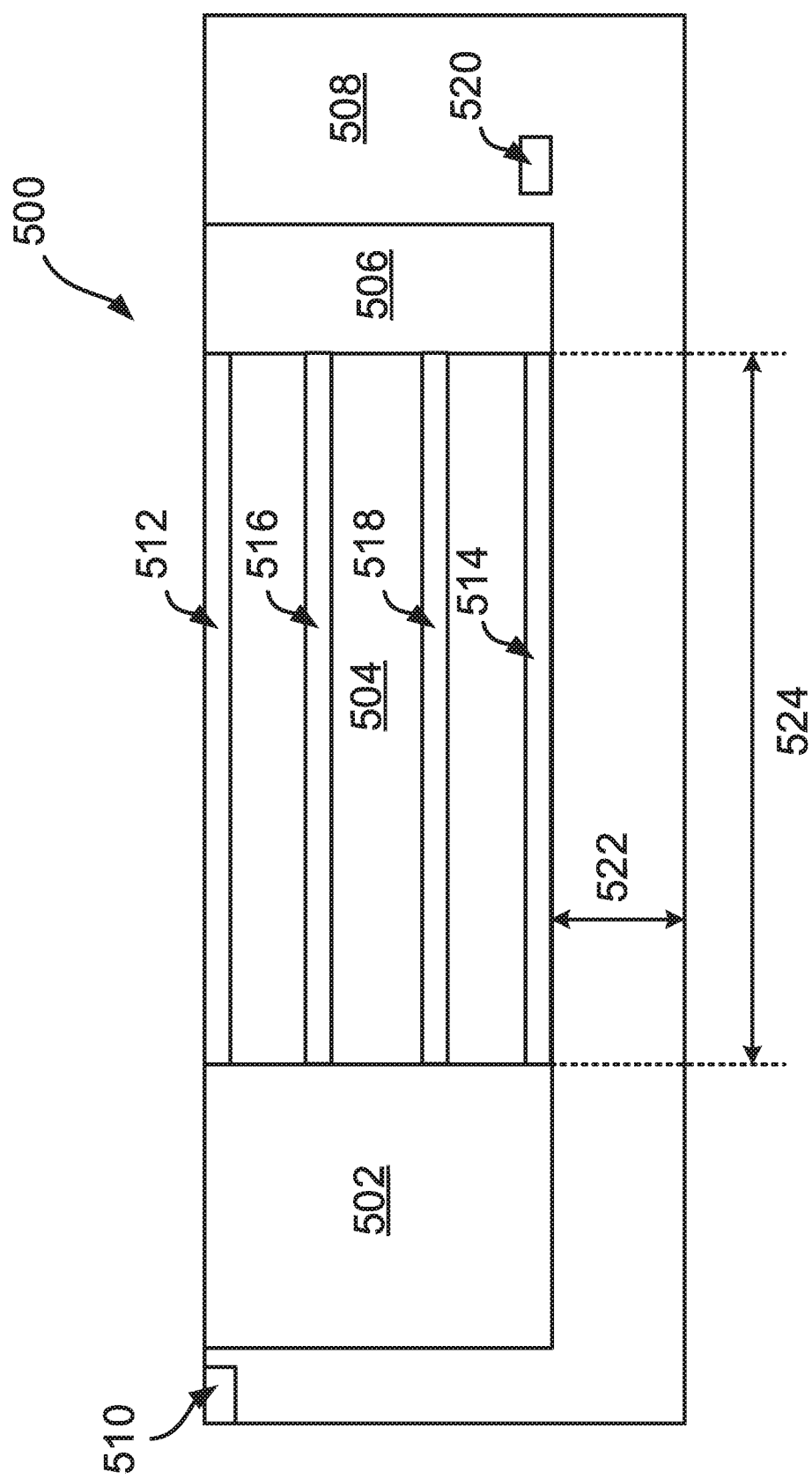
FIG. 6 shows a data packet according to an embodiment of this disclosure.

FIG. 6 shows a data packet 500 according to an embodiment of this disclosure. The data packet 500 in FIG. 6 is similar in some ways to the data packet 400 shown in FIG. 5. Accordingly, the data packet 500 may include a frame start 510, a frame end 520, a packet header 502, a checksum portion 506 (which may also include a filler if required for the physical layer 30 (e.g. under DPHY)), and a payload. The payload includes a frame 504 of data. Again, the frame 504 may for instance comprise RADAR data or video data received from a vehicle RADAR system or external camera of the vehicle. As shown by the arrow labelled 524 in FIG. 5, the payload data in each packet must be a multiple of some predetermined number of bits (e.g. 8 bits) in length. Line blanking of the packet is shown at 508, and frame blanking is shown by the arrow labelled 522.

The frame 504 may also include a number of lines of embedded data 512, 514, 514, 518. Again, the embedded data 512, 514, 514, 518 may for instance comprise safety data lines of the kind described above.

Some (zero or more) lines of embedded data 512 may be included at the start of the frame 504 and some (zero or more) lines of embedded data 514 may be included at the end of the frame 504. Additionally, as can be seen in FIG. 6, some (zero or more) lines of embedded data 516, 518 may be included at locations with the frame data 504, i.e. neither at the start of the frame data (as per the embedded data 512) nor at the end of the frame data (as per the embedded data 514). Thus, in accordance with embodiments of this disclosure embedded data (e.g. lines of safety data, or test data) can be inserted between lines of functional data in the frame data 504. This can be achieved by allocating more than one circular buffer to each virtual channel (i.e. a buffer for functional data and a buffer for safety line data). Maintaining separate buffers for different data types as described herein can allow the embedded data to be located anywhere in the frame, without the possibility of overwriting any data. This allocation of the circular buffers can be made at system start up as noted previously.

Accordingly, there has been described a method of acquiring data, a computer program product for implementing the method, a system for acquiring data, and a vehicle including the system. The method includes determining one or more data types and virtual channels required for one or more applications. The method also includes allocating a plurality of circular buffers in memory according to the determined data type(s) and virtual channel(s). One or more of the circular buffers are allocated to safety data lines. The remaining circular buffers are allocated to functional data lines. The method further includes storing at least one functional data line in a circular buffer allocated to functional data lines according to a data type and virtual channel of the functional data line. The method also includes storing at least one safety data line in a circular buffer allocated to safety data lines.

Although particular embodiments of this disclosure have been described, it will be appreciated that many modifications/additions and/or substitutions may be made within the scope of the claims.

The invention claimed is:

1. A method of acquiring data, the method comprising:
   determining one or more data types and virtual channels required for one or more applications;
   allocating a plurality of circular buffers in memory according to the determined data type(s) and virtual channel(s), wherein one or more of the circular buffers are allocated to safety data lines and the remaining circular buffers are allocated to functional data lines;

storing at least one functional data line in a said circular buffer allocated to functional data lines according to a data type and virtual channel of the functional data line;

determining an origin of at least one safety data line; and storing the at least one safety data line in a said circular buffer allocated to safety data lines wherein a data path for processing the at least one safety data line is selected based on the origin of the at least one safety data line.

2. The method of claim 1, wherein the at least one safety data line and the at least one functional data line are received from an external component.

3. The method of claim 2, wherein the data path for processing the at least one safety data line is further used for processing the at least one functional data line.

4. The method of claim 1, wherein the data path for processing the at least one safety data line is a first data path, wherein the at least one safety data line is generated locally by software, and wherein a second data path is used for processing the at least one functional data line.

5. The method of claim 4, further comprising performing a self test routine in which test data is generated locally and processed along the first data path along which the at least one safety data line is processed.

6. The method of claim 1, wherein the at least one safety data line is received or generated while no functional data lines are being received.

7. The method of claim 1, wherein the one or more applications include vehicle RADAR and/or an external camera of a vehicle.

8. A computer program product on a carrier medium, comprising program instructions for implementing the method of claim 1.

9. A system for acquiring data, the system comprising:

memory; and a processor operable to:

determine one or more data types and virtual channels required for one or more applications;

allocate a plurality of circular buffers in the memory according to the determined data type(s) and virtual channel(s), wherein one or more of the circular buffers are allocated to safety data lines and the remaining circular buffers are allocated to functional data lines;

store at least one functional data line in a said circular buffer allocated to functional data lines according to a data type and virtual channel of the functional data line;

determine an origin of at least one safety data line; and store the at least one safety data line in a said circular buffer allocated to safety data lines wherein a data path for processing the at least one safety data line is selected based on the origin of the at least one safety data line.

10. The system of claim 9, wherein the processor is further operable to receive the at least one safety data line and the at least one functional data line from an external component.

11. The system of claim 10, wherein the processor is further operable to process the at least one safety data line and the at least one functional data line using the same data path.

12. The system of claim 9, wherein the data path for processing the at least one safety data line is a first data path, wherein the processor is further operable to:

generate the at least one safety data line locally; and process the at least one safety data line along the first data path, wherein a second data path is used for processing the at least one functional data line.

13. The system of claim 12, wherein the processor is further operable to perform a self test routine in which test data is generated locally and processed along the first data path along which the at least one safety data line is processed.

14. The system of claim 9, wherein the one or more applications include vehicle RADAR and/or an external camera of a vehicle.

15. A vehicle comprising a system for acquiring data, the system comprising:

memory; and a processor operable to:

determine one or more data types and virtual channels required for one or more applications;

allocate a plurality of circular buffers in the memory according to the determined data type(s) and virtual channel(s), in which one or more of the circular buffers are allocated to safety data lines and in which the remaining circular buffers are allocated to functional data lines;

store at least one functional data line in a said circular buffer allocated to functional data lines according to a data type and virtual channel of the functional data line;

determine an origin of at least one safety data line; and store the at least one safety data line in a said circular buffer allocated to safety data lines, wherein a data path for processing the at least one safety data line is selected based on the origin of the at least one safety data line.

16. The vehicle of claim 15, wherein the system is operable to receive the at least one safety data line and the at least one functional data line from an external component.

17. The vehicle of claim 16, wherein the system is operable to process the at least one safety data line and the at least one functional data line using the same data path.

18. The vehicle of claim 15, wherein the data path for processing the at least one safety data line is a first data path, wherein the system is operable to:

generate the at least one safety data line locally; and process the at least one safety data line along the first data path, wherein a second data path is used for processing the at least one functional data line.

19. The vehicle of claim 18, wherein the system is operable to perform a self test routine in which test data is generated locally and processed along the first data path along which the at least one safety data line is processed.

20. The vehicle of claim 15, wherein the one or more applications include a RADAR system of the vehicle and/or an external camera of the vehicle.

* * * * *